United States Patent [19]
Laham et al.

[11] Patent Number: 6,160,992
[45] Date of Patent: Dec. 12, 2000

[54] METHOD AND SYSTEM FOR COMMUNICATING WITH REMOTE UNITS IN A COMMUNICATION SYSTEM

[75] Inventors: Mohammad Laham, Basking Ridge; Charles Sanford, Somerset, both of N.J.

[73] Assignee: Lucent Technologies Inc., Murray Hill, N.J.

[21] Appl. No.: 08/741,009

[22] Filed: Oct. 31, 1996

[51] Int. Cl.⁷ ........................................ H04B 7/15
[52] U.S. Cl. .................... 455/11.1; 455/9; 455/67.1; 455/423; 455/550
[58] Field of Search .................. 455/9, 11.1, 15, 455/17, 67.1, 423, 424, 422, 550, 560–561, 575, 425; 375/211, 213; 370/241, 246

[56] References Cited

U.S. PATENT DOCUMENTS

| | | |
|---|---|---|
| 4,748,655 | 5/1988 | Thrower et al. . |
| 5,086,506 | 2/1992 | Hall et al. ...................................... 455/9 |
| 5,410,753 | 4/1995 | Szabo ......................................... 455/92 |
| 5,541,979 | 7/1996 | Leslie et al. . |
| 5,621,732 | 4/1997 | Osawa ..................................... 455/11.1 |
| 5,675,371 | 10/1997 | Barringer ..................................... 455/9 |

FOREIGN PATENT DOCUMENTS 0 487 490 A2   1/1992   European Pat. Off. .

OTHER PUBLICATIONS

T.F. Evans, "Cellemetry^SM", from BellSouth Product Trade Show, 14 pages.

*Primary Examiner*—Doris H. To
*Attorney, Agent, or Firm*—Claude R. Narcisse

[57] ABSTRACT

A method and system for a communication system with a communication center, a communication site, a user station and a remote unit allowing the communication center to communicate with the user station over a user channel and communicate with the remote unit over a system channel such that the communication center can monitor, operate or control the remote unit on as needed basis.

12 Claims, 9 Drawing Sheets

METHOD AND SYSTEM FOR COMMUNICATING WITH REMOTE UNITS IN A COMMUNICATION SYSTEM

BACKGROUND OF THE INVENTION

I. Field of the Invention

This invention relates to communications systems and more particularly to the monitoring, operating and controlling of remote equipment in a communication system.

II. Description of the Related Art

Communication systems and, in particular wireless communications networks such as cellular network communication systems, use various equipment throughout their systems to process and maintain the quality of signals carrying user generated information such as text, voice, and video. Equipment located throughout the system which are remotely located from each other are often used to improve signal quality in areas that would otherwise receive a degraded signal or no signal at all or in areas where a signal that is transmitted would be degraded when received. In order to ensure the proper functioning of these communication systems, the remote equipment must be monitored, controlled and operated on a continual basis.

FIG. 1 is a system level diagram of a cellular wireless communications system similar to the Autoplex® cellular communications system (Autoplex is a registered trademark of Lucent Technologies, Inc.) available from Lucent Technologies, Inc. of Murray Hill, N.J. The Autoplex® cellular communications system, when configured as a Code Division Multiple Access (CDMA) system, is in compliance with the TIA/EIA/IS-95A communication protocol. The TIA/EIA/IS-95A protocol is a compatibility standard for cellular mobile telecommunications systems that dictates how information is to be transmitted, processed and received in a communication system that uses a Code Division Multiple Access scheme or wideband spread spectrum mode of operation. FIG. 1 depicts communication center 2 connected to a telephone network such as public switch telephone network (PSTN) 4. Communication center 2, commonly referred to as a Mobile Switching Center (MSC), is connected to network 4 via trunk line 6 which carries information between network 4 and communications center 2. Communications center 2 is also connected to communication sites 8, commonly referred to as cell sites or base stations, throughout the cellular network. Each communication site 8 is located in a particular cell 10. Communications between communication center 2 and communication sites 8 is provided by communication channel 12 which is typically a trunk line. Each cell 10 is represented by a hexagon which is a symbolic representation of the geographic terrain or particular physical area that is being served by a communication site. That is, each cell 10 has a communication site 8 which communicates with user stations or mobile stations within that cell via a user channel such as a wireless user channel.

Also, system information is conveyed between communication site 8 and the user stations or between communication site 8 and communication center 2. The system information, commonly referred to as overhead information includes information such as a request by a mobile station for assignment of a user channel, information concerning the status of a mobile station, user channel assignment by communication site 8, and communications with communication center 2 regarding handoffs between cells. System information is transmitted and received using one or more overhead or system channels that are separate from the user channels. The system channel and the user channels will be discussed in greater detail below. For clarity, in the figures discussed below, channels which typically carry user information are depicted with solid lines while channels that typically carry system information are depicted with broken lines.

FIG. 2 is a detailed diagram of a particular cell of a CDMA based cellular communication system. The particular cell being shown is that of the Autoplex® cellular communications system as currently configured and designed. System information is conveyed over system channel 24 of communication channel 12 between communication center 2 and communication site 8. User information is conveyed over user channel 22 of communication channel 12 between communication center 2 and communication site 8. Communication center 2 is known as the Autoplex® cellular communications system Control Complex which has digital switch 14 that interfaces to PSTN 4 and a call processing module 16 which in turn interfaces with an Operation Administration and Maintenance (OA&M) module 18 and Maintenance Cathode Ray Tube (MCRT) 20. Call processing module 16 processes, packages and routes incoming and outgoing user and system information in accordance with the IS-95A protocol and any other protocol developed for the system. Call processing module 16 relays incoming user information to PSTN 4 via trunk line 6. Incoming system information is recognized as such by call processing module 16 which routes such information to OA&M module 18. OA&M module 18 processes the received system information so that the information is displayed on MCRT 20. Outgoing user information originating from PSTN 4 is relayed by call processing module 16 to communication site 8 over user channel 22 of communication channel 12. Outgoing system information originates from call processing module 16 or OA&M module 18 which transfers such information to call processing module 16. Outgoing system information may also originate from call processing module 16. Call processing module 16 formats and packages the system information in accordance with the IS-95A standard and then transmits the information over system channel 24 of communication channel 12. Also, communication center 2 uses the system channel information to monitor, operate or control various equipment located at communication site 8. User information is conveyed between communication site 8 and the user stations 28 over wireless user channel 26. User communication link 26 is a full duplex wireless channel which carries user information between communication site 8 and user station 28.

In some cells of a wireless communication system, coverage is limited by structures, such as tall buildings, mountain ranges and other physical obstacles that block or interfere with communication signals. This problem may be addressed by providing remote units 30 that are repeaters. Remote unit 30, configured as a repeater, relays communication signals between communication site 8 and a user or users in an area that cannot be covered adequately by direct communication with communication site 8. The remote unit receives the communication signal from the communication site 8 and performs functions such as noise reductions and amplification on the received signal, and then retransmits or relays the signal to a user in the area that has difficulty receiving signals directly from communication site 8. Similarly, in an area which has difficulty in transmitting a signal directly to communication site 8, the signal is transmitted to a remote unit configured as a repeater which in turn relays the signal to communication site 8. The repeater relays both user information and system information to communication site 8 and user station 28.

System information between user stations 28 and communication site 8 is conveyed over a system communication link, commonly referred to as an overhead channel, that is separate from user communication link 26. The system communication link comprises two simplex channels referred to as paging channel 36 and access channel 38. Paging channel 36 is used by the communication site 8 to transmit system information to user stations 28 and remote units 30 configured as repeaters. User stations 28 and remote units configured as repeaters use access channel 38 to transmit system information to communication site 8. The system information is conveyed over system channel 24 of trunk line 12 between communication site 8 and communication center 2. Thus, user stations 28 have the capability to communicate with communication center 2 over system channels. Also, remote units configured as repeaters, relay system information to user stations 28 over paging channel 36 and relay system information from user stations 28 over access channel 38. Remote units 30, configured as repeaters, do not have the capability of transmitting or receiving system information associated with their operation, monitor or control and thus cannot be monitored by communication center 2.

A typical method used to monitor remote units 30, configured as repeaters, is illustrated in FIG. 3. Remote unit controller 32 monitors and controls remote units 30 through its communication link 34 with communication center 2. Communication link 34 is a two-way link which may be, for example, a telephone link with modems or a dedicated Ethernet link. The information transmitted over link 34 by remote unit controller 32 is received and processed by communication center 2. The information is then relayed over communication channel 12 to communication site 8 which in turn transmits the information over user link 26 to the particular remote unit 30 being monitored. The remote unit that is being monitored acknowledges the reception of the information and, if necessary, transmits a response to controller 32 over user link 26.

Thus, this method utilizes user links 26 in order to monitor the remote units 30. As a result of this configuration, the amount of user links available to users of the system is decreased when remote unit controller 32 is in the process of monitoring remote units 30. An additional disadvantage to this configuration is the limited ability of remote unit controller 32 to have access to any remote unit 30 on an as needed basis. Remote unit controller 32 is simply another user of the system which must compete for available user channels before it can operate, monitor or control remote unit 30.

The TIA/EIA/IS-95A protocol requires that, upon powering up of the system, all user stations 28 (or mobile station) in each cell 10 follow an initialization process represented by the state diagram shown in FIG. 4. For the sake of simplicity, not all the possible state transitions of a user station are shown. Some of the state transitions shown are not discussed herein to any great detail as they are not relevant to the subject matter of this invention; however, all of the state transitions are well known in the art and are part of the TIA/EIA/IS-95A standard. Referring to FIG. 4, upon power up, each user station enters an Initialization State via transition 40. Once the user station has been fully integrated into or registered with the communication system, it enters an Idle State through transition 42. In the Idle State, the user station monitors messages on the paging channel and enters the System Access State through transition 48 when it receives a paging channel message that requires a response. If for some reason, the user station has difficulty in receiving messages over the paging channel, it reenters the Initialization State via transition state 44. In the System Access State, the user station sends messages to the communication site on the access channel. Transition 50 allows the user station to enter the Traffic Channel state which allows the user station to communicate with the communication site over a user link 26.

While in the System Access State, the user stations can respond to requests from the communication center concerning system status and operation via the communication site with a set of pre-defined message formats. The messages are specifically related to user station functions which are recognized as such by the communication center. Also, the user stations can transmit to the communication center a general data message in a message packet formatted in a Data Burst message mode in accordance with the TIA/EIA/IS-95A protocol. The messages formatted in the Data Burst message mode are transmitted over the access channel to the communication site and relayed to the communication center. These data burst messages are not used by the communication center 2 for system operation; they are processed and relayed to PSTN 4 or user stations 28. This message format is used to convey text information, referred to as Short Message Services for Wideband Spread Spectrum System, between user stations. Remote units configured as repeaters do not have the capability to process these messages. These messages are simply relayed on to a user station or to a communication site by the remote unit configured as a repeater. Thus, regardless of the particular mode of system communication being followed by the system, the remote unit configured as a repeater does not have the capability to communicate with the communication center to allow the communication center to operate, monitor and/or control the remote unit.

SUMMARY OF THE INVENTION

The present invention provides a communication system comprising a communication center, a communication site and a remote unit that can be monitored, operated and controlled by the communication center with system information. The system information is conveyed over a system channel that is part of a communication channel between the communication center and the communication site. The system information is also conveyed over a system link that is part of a communication link between the communication site and the remote unit.

Another embodiment of the present invention provides a method for monitoring, operating and/or controlling the remote unit by the communication center by first formatting the system information in accordance with a protocol being followed by the system. The system information is then transmitted from the communication center over the system channel to the communication site where it is broadcast over the system link to the remote unit.

DETAILED DESCRIPTION

Figure 1:
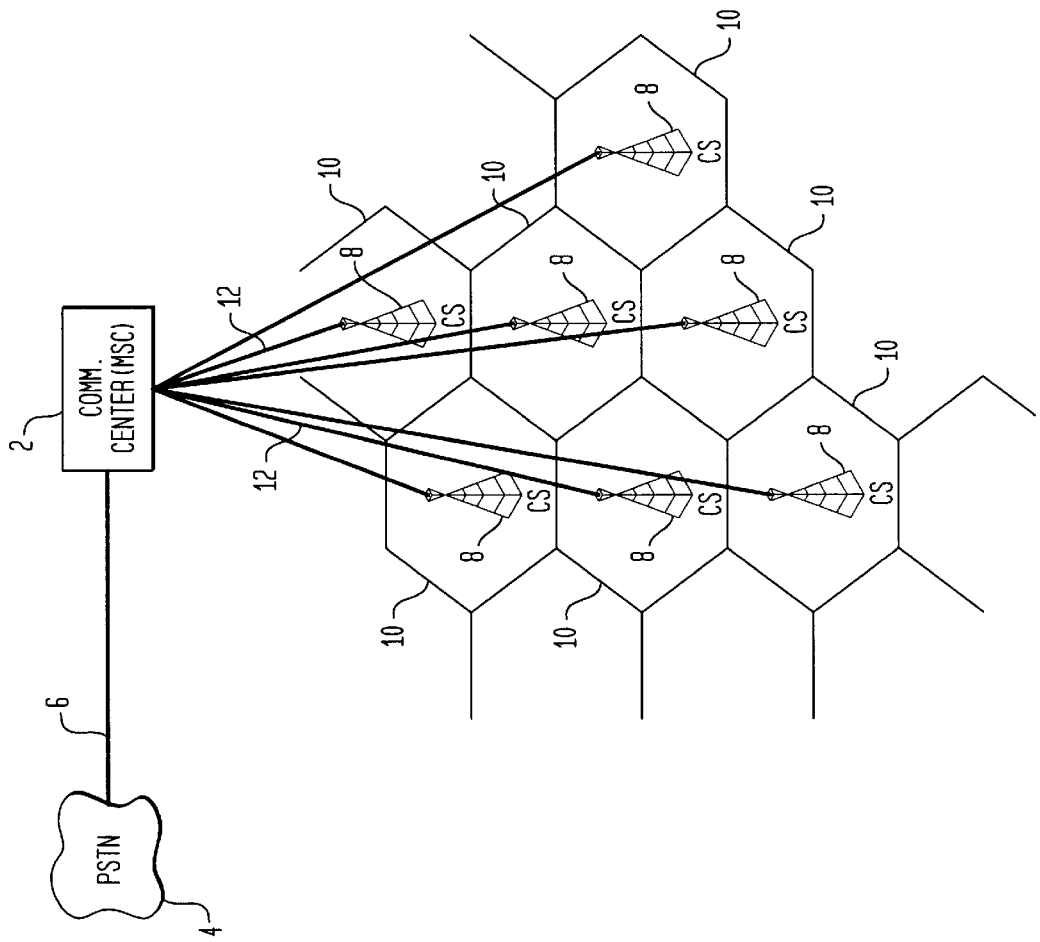
FIG. 1 is a prior art system level diagram of a typical cellular communication system.
Figure 2:
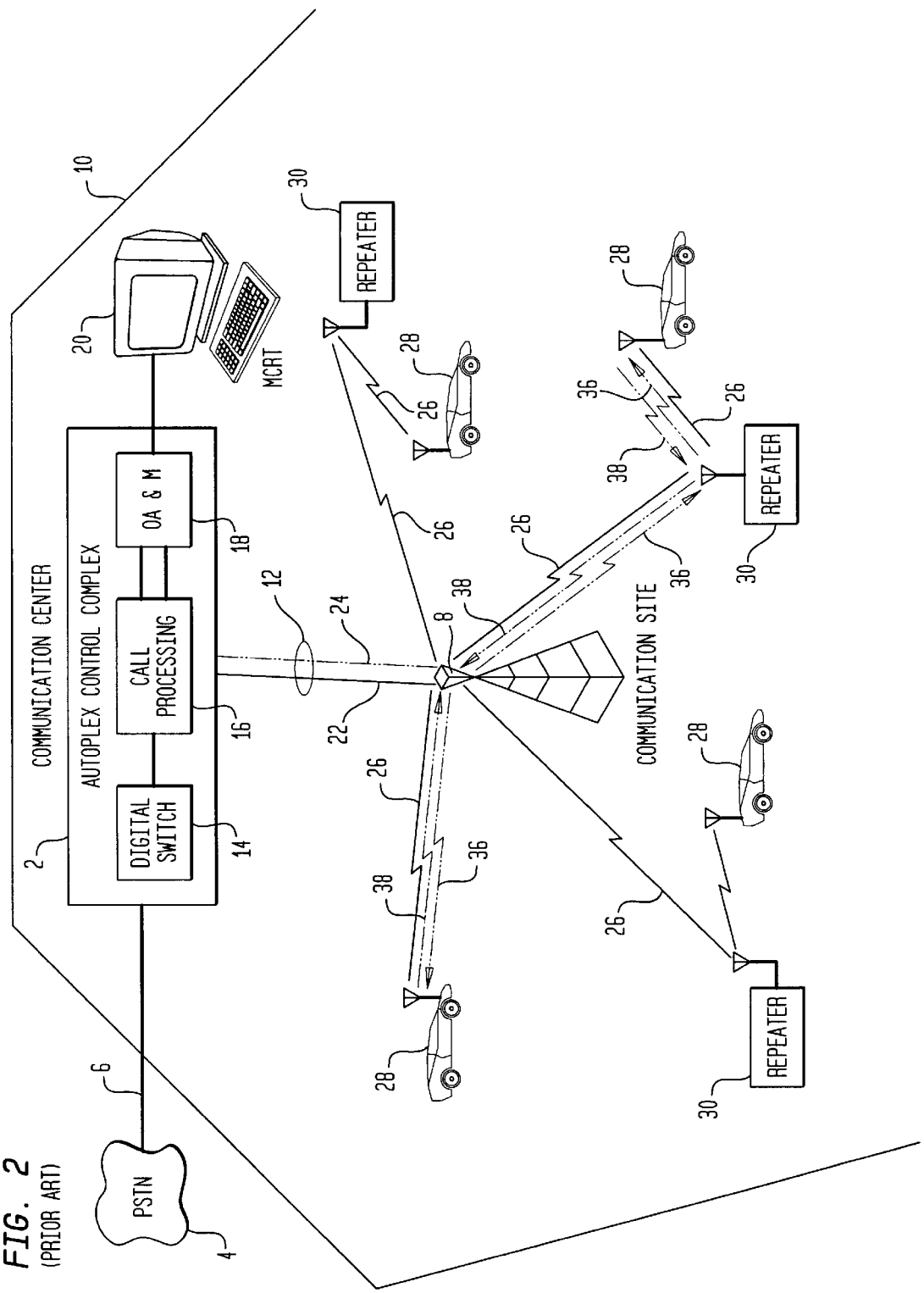
FIG. 2 is system diagram of a particular cell of the communication system.
Figure 3:
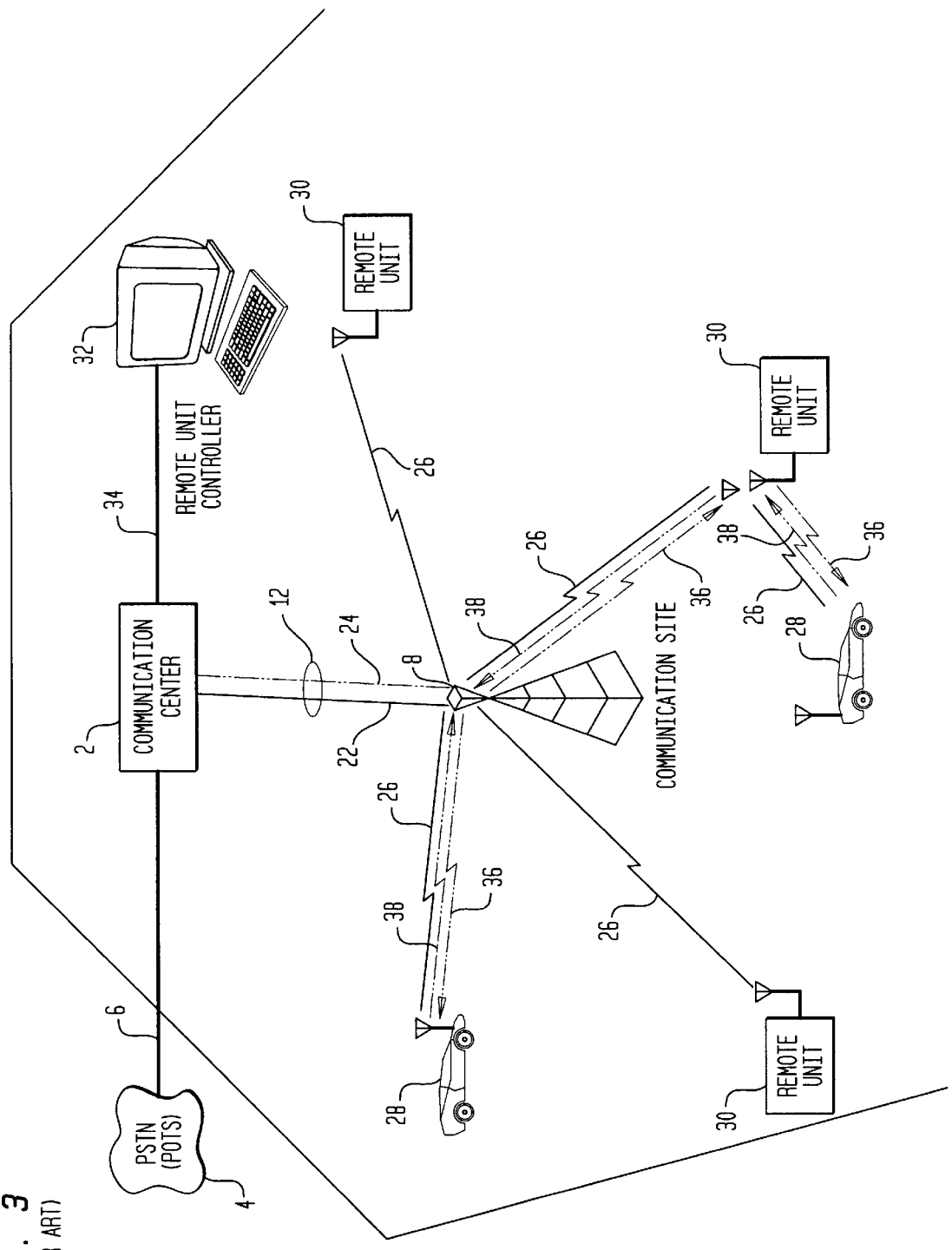
FIG. 3 is a system diagram of a cell that uses a remote controller unit to monitor remote units located within the cell.
Figure 5:
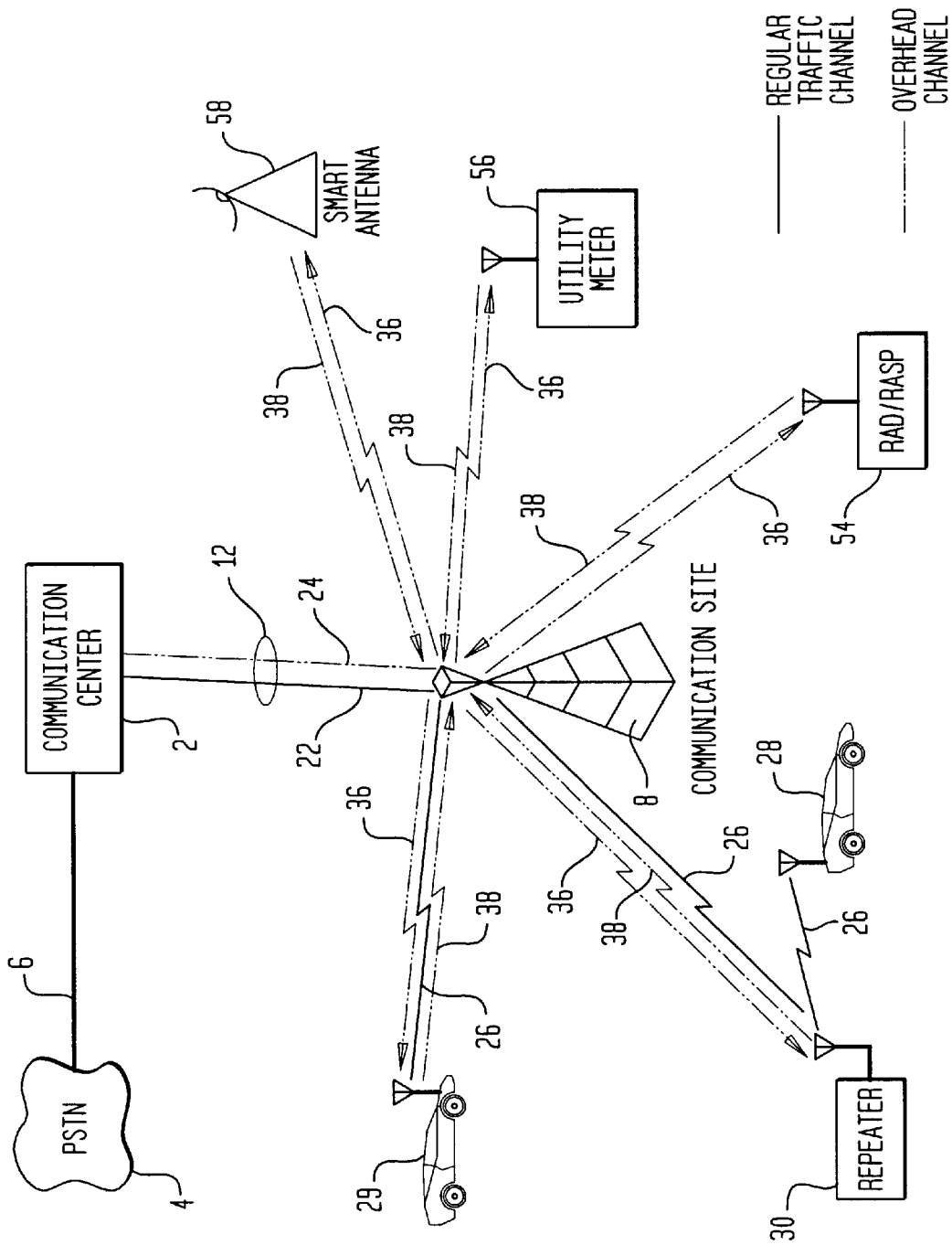
FIG. 5 is a system level diagram of the present invention depicting user and system channel connections between a communication center, a communication site, remote units and user stations;.

FIG. 5 is a system level diagram of a communication system which is configured in accordance with an embodiment of the present invention. Communication center 2 monitors, operates-and controls the remote units with the use of system information conveyed over system channel 24 and a system link comprising paging channel 36 and access channel 38 without having to use external hardware and software such as remote unit controller 32 and without the use of user communication links as discussed in reference to FIG. 3. The system link is part of a communication link between communication site 8 and the remote units where said communication link further comprises user communication link 26 for conveying user information. Communication center 2 transmits system information to communication site 8 over system channel 24 that is intended only for a particular remote unit in order to control, operate and monitor that particular remote unit. The system information is broadcast by communication site 8 over paging channel 36. The remote units have the capability to respond to the system information transmitted by communication center 2 and the remote units can initiate communication with communication center 2 by transmitting system information over access channel 38. The response is relayed to communication center 2 by communication site 8 over system channel 24.

Communication center 2 is connected to Public Switched Telephone Network 4 via trunk line 6. Communication center 2 is also connected to communication site 8 via communication channel 12 comprising user channel 22 for conveying user information and system channel 24 for conveying system information. Communication channel 12 is typically a trunk line having a high data rate capacity. The communication link between communication site 8 and the remote units comprising paging channel 36, access channel 36 and user channel 26 is typically a wireless communication channel. Access channel 38 and paging channel 36 allow communication site 8 to communicate with various remote units such as Smart Antenna 58, Utility Meter 56, Remote Antenna Driver/Remote Antenna Signal Processor (RAD/RASP) 54 system, which processes cable TV signals formatted as CDMA signals, repeater 30 and user station 28. System information originating from a remote unit is transmitted to communication site 8 over access channel 38. System information broadcast by communication site 8 to the remote units is conveyed over paging channel 36. Each remote unit, except those configured as repeaters, only transmits and receives system information intended for that particular remote unit. All of the remote units are treated by the system as if they were user stations conveying system information and they follow the same protocol normally used by the user stations 28 for transmitting system information over access channel 38 and receiving system information over paging channel 36. In this manner they can be monitored, controlled operated by communication center 2. User information such as text, voice or video, is carried over user communication link 26 between user station 28, repeater 30 and communication site 8. In addition to relaying user and system information from a user station to communication site 8 and vice versa, repeater 30 can now communicate with communication center 2 via communication site 8 over paging channel 36, access channel 38 and system channel 24. Repeater 30 can distinguish between system information it receives for relaying on to a user station or to communication site 8 and system information intended for its own use. System information intended for repeater 30 is processed by the repeater so that it can be monitored, operated and controlled by communication center 2. The communication system described above may include a plurality of communication sites where each communication site relays system and user information from communication center 2 to a particular set of remote units and also relays information from the remote units to communication center 2. Communication site 8 can transmit system and user information directly to user station 29 over the communication link which comprises access channel 38, paging channel 36 and user link 26.

Figure 6:
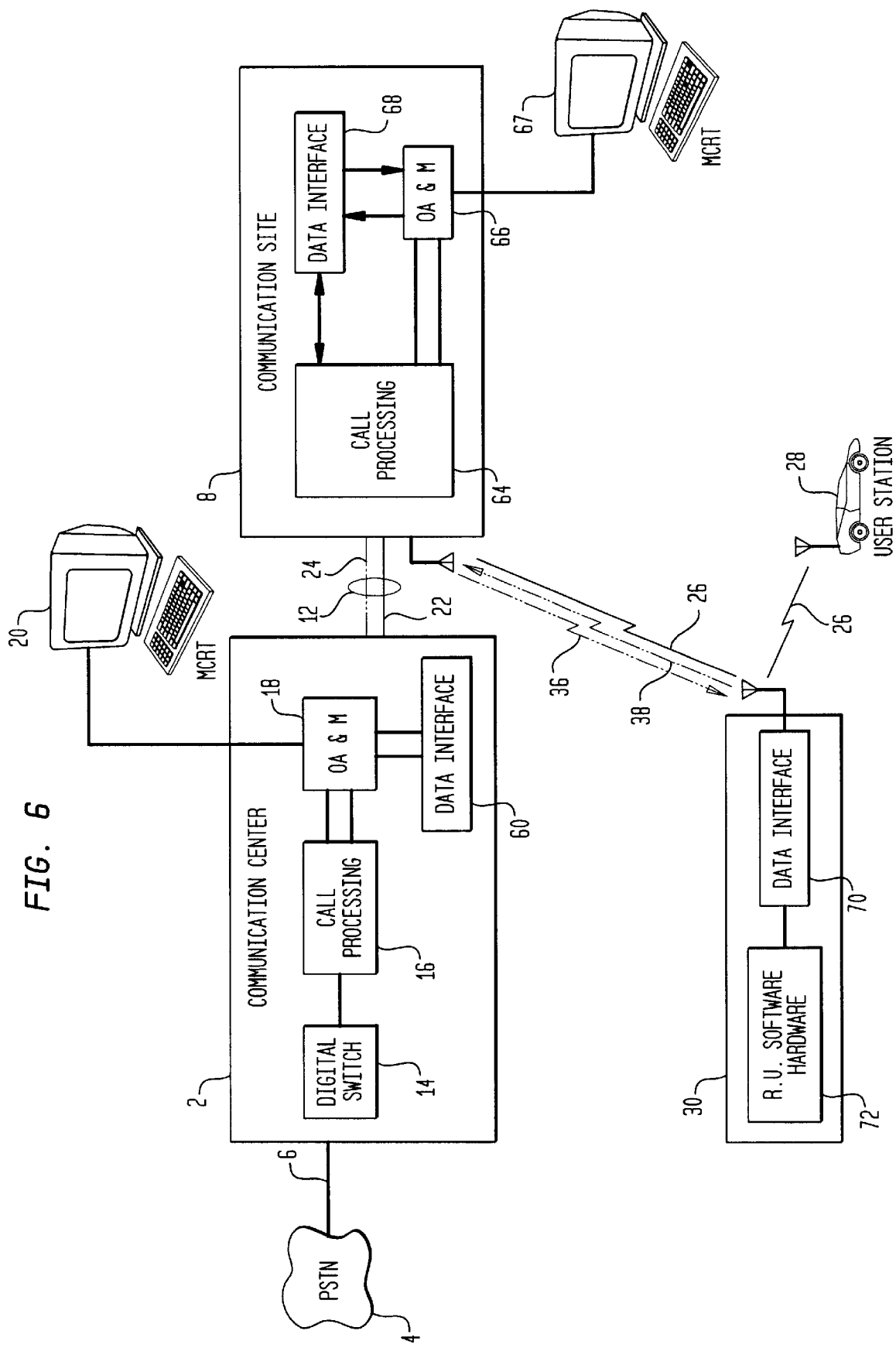
FIG. 6 is a diagram of a particular cell including a communication site, a remote unit and a user station.

FIG. 6 illustrates the system of FIG. 5 which uses a CDMA scheme and follows the TIA/EIA/IS-95A protocol. The remote unit shown is repeater 30. Communication center 2 includes data interface module 60, OA&M module 18 and call processing module 16. Incoming system information to communication center 2 can, for example, originate from repeater 30. Data interface module 70 receives information from the software and hardware system 72 of repeater 30. Data interface module 70 encodes, formats and packages the message in accordance with the IS-95A protocol and transmits the information over access channel 38 to communication site 8. The system information is received by call processing module 64 of communication site 8 which relays the information to communication center 2 via system channel 24 after the information has been processed by OA&M module 66. OA&M module 66 processes all system information except information associated with a remote unit. Information associated with a remote unit is transferred to data interface module 68 so it can be viewed on MCRT 67 if so requested by an operator of communication site 8. Otherwise OA&M module 66 merges all system information, reformats the merged system information in accordance with the message mode being followed and transfers the combined system information to call processing module 64 for transmission to communication center 2. The system information is received by call processing module 16 of communication center 2 and recognized as system information. Call processing module 16 transfers OA&M system information and system information associated with repeater 30 to OA&M module 18. OA&M module 18 processes the system information so that it can be viewed and analyzed on MCRT 20. OA&M module 18 routes system information associated with repeater 30 to data interface module 60 which processes such information so that it can be displayed on MCRT 20. It should be noted that data interface 60 processes the system information associated with a remote unit so that such information can be displayed on MCRT 20 or sent to other peripheral devices such as a printer or a storage device.

System information from communication center 2, such as messages or commands to operate, monitor and control repeater 30, originate from MCRT 20 or other peripheral device. Such information is received by OA&M module 18 and is transferred to data interface 60 for processing. Data interface module 60 processes the system information so that it can be interpreted by data interface module 68 of communication site 8 and data interface module 70 of repeater 30 or any other data interface located within the system. OA&M module 18 then receives the processed command and packages it in accordance with the IS-95A protocol so that it is recognized as system information by call processing module 64 at communication site 8. The information is then transferred to call processing 16 which further processes the information to ensure that it complies with the protocol. Call processing 16 then transmits the information over system channel 24 to communication site 8 and reformats the information in accordance with the message mode being followed. The information is received by call processing module 64 of communication site 8. Call processing 64 recognizes the information as system information and relays the information over paging channel 36 in accordance with the IS-95A protocol. The system information being relayed by call processing module 64 of communication site 8 can be viewed on MCRT 67 if so requested by an operator of communication site 8. Data interface 68 processes all information associated with remote units so that such information can be viewed on MCRT 67 or transferred to some other peripheral device such as a printer or a storage device. OA&M 66 module also merges the system information intended for a remote unit with other system information such as system information for user stations, reformats the merged information in accordance with the message mode being followed and transfers the combined system information to call processing module 64 for broadcast over paging channel 36.

The information is then received by data interface module 70 of repeater 30. When the remote unit is a repeater, as shown in FIG. 6, data interface module 70 must first determine whether the received system information is intended for the monitor, control and operation of repeater 30 or for relaying on to user station 28. System information intended for repeater 30 is processed accordingly by data interface module 70. Other system information is relayed on to user station 28. If the system information is intended for repeater 30, the received information may request that an operation be performed by the remote unit. Data interface module 70 processes the received information so that it is properly interpreted by software and hardware module 72 causing the module to perform the requested operation. The received information may require a response by data interface 70. In such a circumstance, data interface module 70 formats and packages the response in accordance with the IS-95A protocol and sends the response to communication center 2 via communication site 8. That is, data interface module 70 transmits system information regarding remote unit 30 over access channel 38 to communication site 8. Call processing 64 recognizes the response as system information bound for communication center 2 and then relays the information to communication center 2 over system channel 24. The response is recognized by call processing 16 as system information. Call processing 16 transfers the information to OA&M module 18 which processes incoming system information and transfers system information associated with remote units to data interface module 60. Data interface module 60 processes the information so that it can be viewed on MCRT 20 or other peripheral device. User information received by the repeater 30 over user link 26 is relayed to user station 28 and is not disturbed by the system information being used by communication center 2 to monitor, operate and control repeater 30. User information from user station 28 is received by repeater 30 which relays such information to communication site 8 via user link 26. The user information is then transmitted to communication center 2 via user channel 22 of communication channel 12.

Referring back to FIG. 4, there was shown the various states that a user station performs, under the IS-95A protocol, in order to be integrated within the communication system. Thus, each remote unit experiences the same transition states shown in FIG. 4 with the exception of states 50 and 52. When a remote unit enters the system access state, it is ready to send information to the communication center via the communication site.

Figure 7:
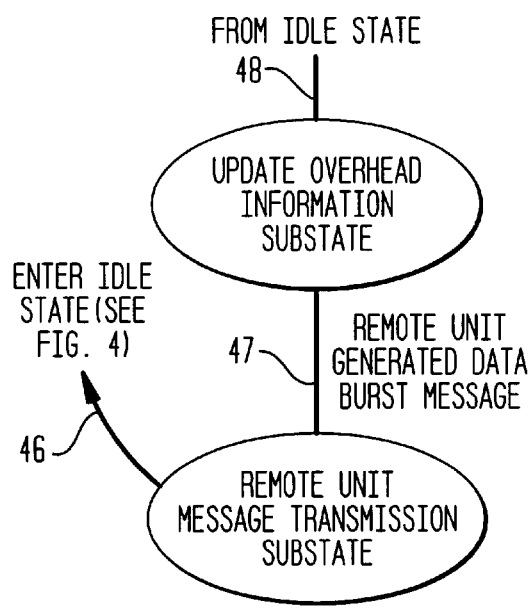
FIG. 7 depicts a detailed state transition diagram of the Access State.
Figure 8:
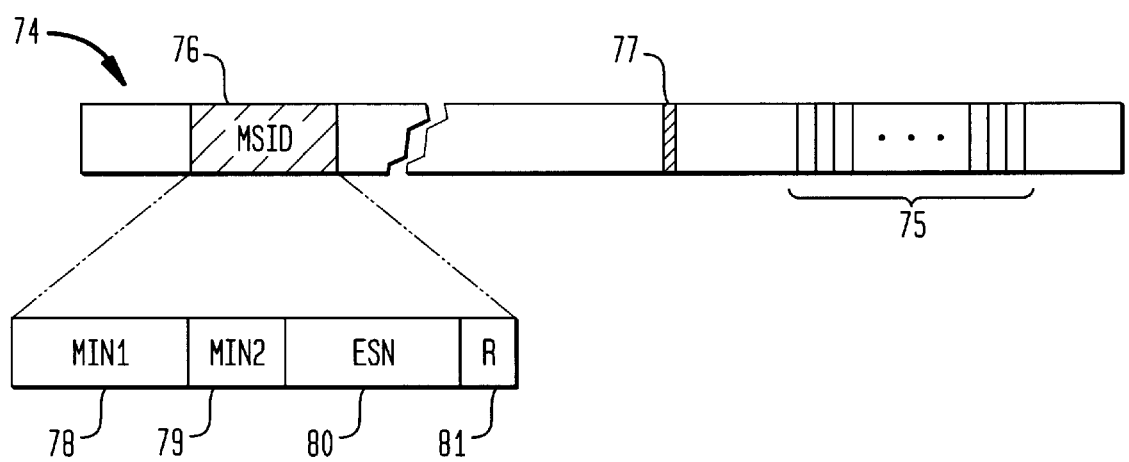
FIG. 8 illustrates a System Information message packet in the Access State.

FIG. 7 illustrates a detailed description of the System Access State. System or overhead channel information is updated and then the remote unit enters the message transmission substrate via state transition 47. FIG. 8 illustrates the Data Burst Message generated in accordance with the IS-95A protocol. There are various types of messages defined in the IS-95A protocol. The Data Burst Message format is the type of message that will be discussed herein. In particular, the message is in the form of a variable length message packet 74 containing at least a CHAR field 75, a Mobile Station Identifier (MSID) field 76, a NUM_FIELDS field 77 and other fields not directly pertinent to the subject matter of this invention and are therefore not discussed herein.

There are various types of MSID fields, one of which is discussed below. The MSID field shown in FIG. 8 contains two Mobile Identification Number subfields, MIN1 78 and MIN2 79 where MIN1 is 24 bits long and MIN2 is 10 bits long. MSID 76 field further contains Electronic Serial Number (ESN) subfield 80 which is 32 bits in length and Reserved subfield 81 which is 6 bits long. In general, the MSID field is used to identify each user station which has been integrated into the system. Thus, in addition to each user station having a unique MSID, each remote unit is assigned a unique MSID field which contains a particular set of MIN1, MIN2 and ESN identification numbers.

Num_Field field 77 is 8 bits long and indicates the number of characters contained in the data message located in the CHAR field 75. CHAR field 75 is N bytes long where N equals the number stored in NUM_FIELD 77. Each byte is 8 bits in length. System messages associated with a remote unit can be placed in CHAR field 75 and transmitted to communication center 2 via communication site 8. The message packet is formed at data interface module 70 of the remote unit. The particular message being sent is placed in the CHAR field 75 and is encoded such that it is recognized and understood by data interface module 68 of communication site 8 and data interface module 60 of communication center 2. The message packets may be packaged in accordance with the message packet 74 depicted in FIG. 8 or in accordance with other message formats described in the pertinent sections of the IS-95A standard.

Figure 4:
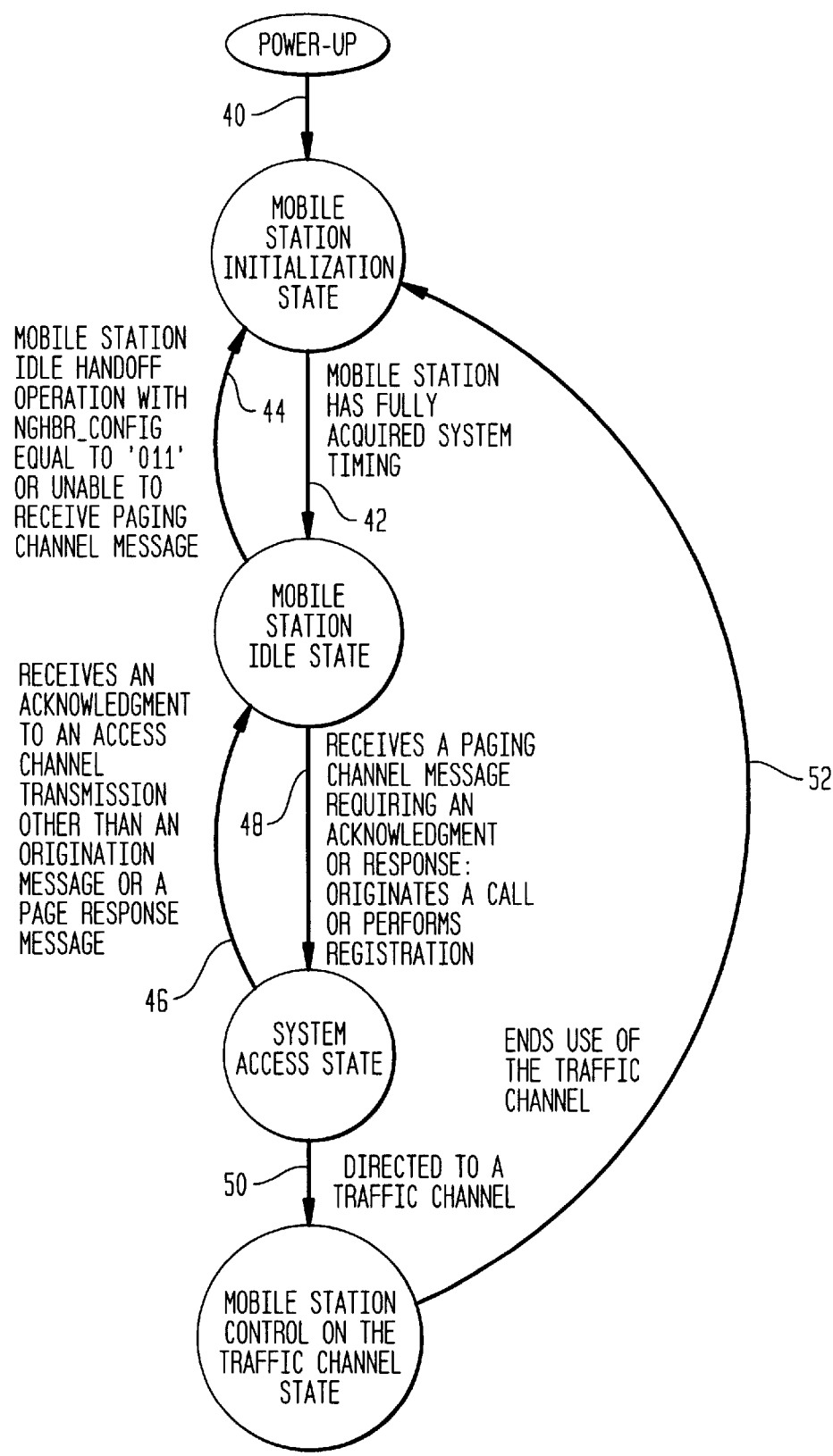
FIG. 4 is a state transition diagram for a particular protocol used by mobile or user stations in a cellular communication system.

The particular encoding scheme devised by the system designers will depend on the specifications and needs of the particular communication system. For example, the remote unit may periodically report the power level of the transmitted signal used to carry user information to be transmitted to the communication site from the remote unit. The remote unit has been integrated into the communication system when it has an MSID and, with the exception of transition states 50 and 52, has performed the transition states required by the IS-95A protocol some of which are depicted in FIG. 4. The remote unit is now in the idle state and is monitoring the paging channel to detect any incoming messages intended for that particular remote unit which is sent by the communication center via the communication site. When the remote unit has not detected any incoming messages designated for it and it desires to enter the Access State, it does so via transition 48 as shown in FIG. 7. The remote unit then formats a message packet such as depicted in FIG. 8. In the message packet MIN1 subfield 78, MIN2 subfield 79 and ESN subfield 80 would contain the identification numbers designated for that particular remote unit. Num_field 77 indicates the number of character contained in the message.

When reporting the power level, the message may be "OUTPUT POWER OF USER CHANNEL IS 0 DB." NUM_FIELD field 77 contains the binary code 00100100 indicating that the message has a total of 36 characters (spaces included). The encoding scheme used by the system designers to encode each character of the message may be ASCII or EBCDIC (other schemes may be used) where each character is represented by an 8-bit code. Each of the 36 characters of the message is then placed consecutively in CHAR field 75. For this example, CHAR field 77 is 36 8-bit bytes in length. The particular message placed in CHAR field 77 is encoded by data interface module 70. The remote unit also formulates all other necessary fields of the message packet (not discussed herein but described fully in the IS-95A protocol) making sure that the packet is in compliance with the IS-95A protocol.

Again, referring to FIG. 6, data interface module 70 then transmits the message packet to communication site 8 over access channel 3 8. Call processing module 64 of communication site 8 receives the message, recognizes it as system information and relays it to communication center 2 over system channel 24. The message can be viewed on MCRT 67 if so requested by an operator of communication site 8. That is, call processing 64 can transfer a copy of the system information to OA&M module 66 which transfers all information associated with any remote unit to data interface 68 for processing so that such information can be viewed on MCRT 67 or other peripheral device. OA&M module 66 also processes system information not associated with a remote unit. Call processing module 16 of communication center 2 receives the information and recognizes it as system information. Call processing module 16 transfers the information to OA&M module 18 which transfers all system information associated with remote units to data interface module 60 which processes the system information so that it can be viewed on MCRT 20.

Similarly, system messages originating from communication center 2 and transmitted over the paging channel 36 from the communication site 8 are packaged and formatted in accordance with the IS-95A standard. In particular, the IS-95A protocol allows the same Data Burst Message format described above to be followed for messages carried over paging channel 36. Thus, the format of the message packet is the same as the packet used for access channel 38. For example, when communication center 2 responds to the status information sent by the remote unit discussed above, it may send the message "INCREASE OUTPUT POWER BY 5 DB." Bit stream 00011101 is placed in Num_Field 77 depicted in FIG. 8 indicating that the incoming message contains 29 characters. The messages are also encoded in accordance with a coding scheme being followed by the system. Again, the encoding scheme for the messages may be ASCII or EBCDIC where each character is represented by an 8 bit code. Other coding schemes may be used as long as they are understood and properly interpreted by the data interface modules. The identification fields (MIN1, MIN2 & ESN depicted in FIG. 8) contain the identification numbers of the particular remote unit for which the message is intended. The message is broadcast by communication site 8 on paging channel 36 and detected by the intended remote unit whose data interface module processes the message causing the remote unit to perform the operation requested by the message.

Figure 9:
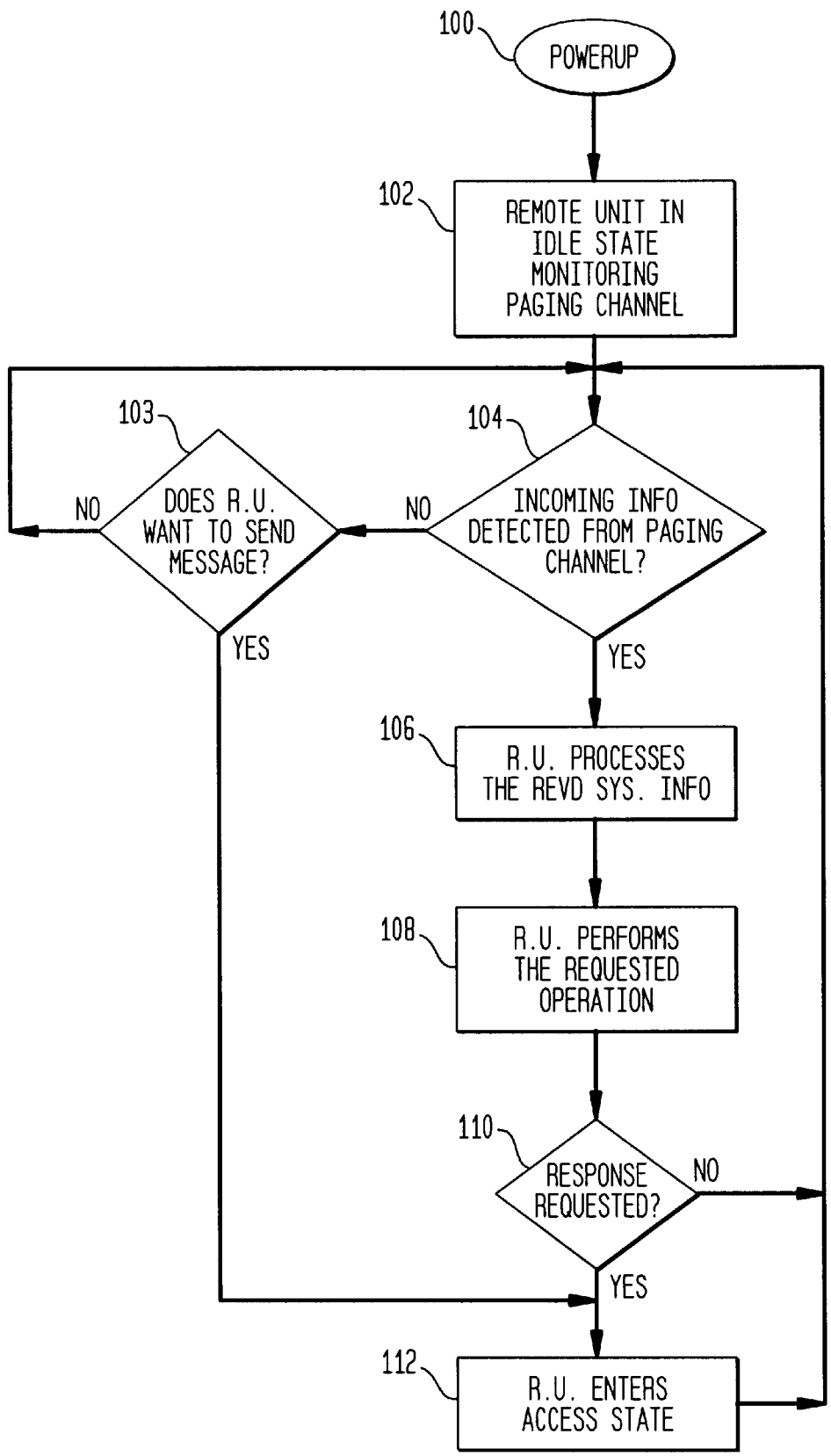
FIG. 9 illustrates the steps taken when information is transmitted to and from the communication center in order to control, monitor and/or operate the remote units.

FIG. 9 is a flow chart illustrating how a remote unit is monitored, operated and controlled. Upon initialization of the system, the remote units are in Idle State 102. Once a remote unit has entered the Idle State 102 it has already exchanged system information with the communication center in accordance with the protocol being followed by the system, i.e., in this example, the IS-95A protocol. While in the Idle State 102, remote unit continually monitors the paging channel to determine whether there are any incoming messages for that particular remote unit. The remote unit remains in this mode until it detects an incoming message or until it needs to send a message over the access channel. That is, during step 104, each remote unit determines whether there are any incoming messages and whether the detected incoming messages are designated for that particular remote unit. Remote unit makes this determination by comparing the identification numbers of each message packet with its assigned identification numbers. If the incoming identification numbers matches its own identification number, then the message packet is received and transferred to the data interface for analysis. Once the entire message has been received by the remote unit, the data interface transfers the message to the software and hardware module of the remote unit to perform the specific operation requested by the message or to formulate a response to the communication center through the access channel . If the remote unit does not detect a message addressed to it over the paging channel, step 103 is executed. In step 103 the remote unit determines whether it should continue to monitor the paging channel or send a message over the access channel.

Step 106 is executed when the remote unit detects system information addressed to it over the paging channel. The information is received and the system proceeds to step 108 where it processes the received information to perform a requested operation specified in the received system information. Step 110 determines whether the remote unit has to transmit a message in response to the received system information. Specifically, the data interface interprets the received information and, if necessary, formulates a response in accordance with the encoding scheme being used. If the remote unit does not have to respond, it returns to step 104 and continues to monitor the paging channel. If a response is required, the remote unit enters Access State 112 whereby it sends messages to the communication site over the access channel in accordance with the protocol being followed by the system as discussed above.

Figure 10:
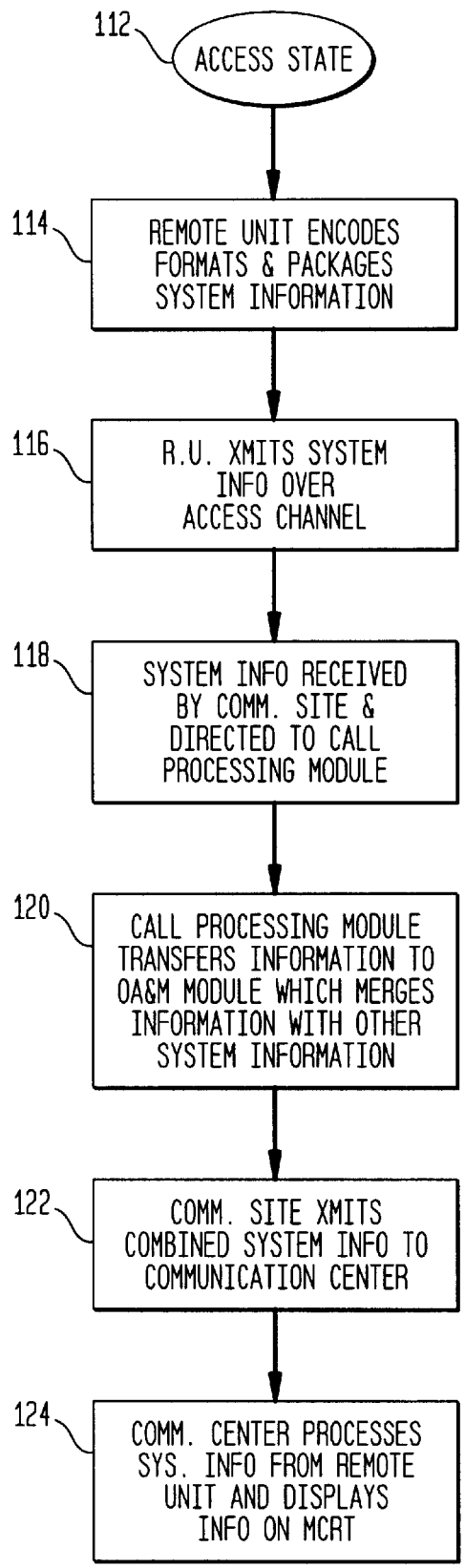
FIG. 10 illustrates the particular steps taken in the Access State.

FIG. 10 is flowchart of the steps performed by the system when the remote unit is in Access State 112. In step 114 of FIG. 10 the remote unit formats and packages the system information as discussed in reference to FIG. 8. In step 116 the system information is transmitted over the access channel. The system information is then received by the communications site where the call processing module recognizes it as system information and directs such information to the system Operation, Administration and Maintenance module (OA&M). In step 120, the communication site merges the system information with other system information bound for the communication center. This is done by simply concatenating all system information into a sequence of message blocks. In step 122, the communication site transmits the combined system information to the communication center 2 over system channel 24. In step 124, the communication center processes the system information from the remote using the call processing module, the OA&M module and the data interface module as previously discussed.

We claim:

1. A remote unit (30) configured as a repeater which is part of a communication system comprising at least one communication center (2) and at least one communication site (8), the remote unit comprising:
   a data interface module (70) configured to transmit and receive system information to and from the at least one communication center via the at least one communication site; and
   a software/hardware module (72) coupled to the data interface module, the software/hardware module is configured to generate system information used to initiate communication with the at least one communication center and perform operations based on received system information from the at least one communication center thus allowing the at least one communication center to control, operate and monitor the remote unit.

2. The remote unit of claim 1 whereby the data interface module is configured to determine whether the system information received from the at least one communication center is intended for a user station (28) or for the remote unit.

3. The remote unit of claim 2 whereby the data interface module is coupled to the user station via a first wireless communication link (26) and coupled to the at least one communication site via a second wireless communication link (26, 36, 38).

4. The remote unit of claim 3 whereby the data interface module causes the system information intended for the user station to be relayed to the user station via the first wireless communication link.

5. The remote unit of claim 3 whereby the data interface module is further configured to receive system information from the user station via the second wireless communication link which system information is relayed to the communication center.

6. The remote unit of claim 3 whereby the data interface module transfers system information intended for the remote unit to the software/hardware module allowing the software/hardware module to generate a response to the received system information or perform an operation in response to the received system information.

7. The remote unit of claim 3 whereby the data interface module formats and packages information from the software/hardware module as system information that complies with the IS-95A protocol and transmits said information to the at least one communication center.

8. The remote unit of claim 7 whereby the transmitted system information is packaged and formatted as a Data Burst Message.

9. The remote unit of claim 7 whereby system information received from the at least one communication center is packaged and formatted as a Data Burst Message.

10. The remote unit of claim 7 whereby the data interface module continually monitors the second wireless communication link to determine whether there are any incoming messages from the at least one communication center.

11. The remote unit of claim 3 where that at least one communication site comprises: a Data interface Module (68) coupled to a Call Processing Module (64) and a OA&M module (66) which is coupled to an MCRT (67) whereby the data interface module (68) is configured to process system information from the remote unit and cause said information to be displayed on the MCRT thus allowing the remote unit to be monitored, operated and controlled.

12. The remote unit of claim 11 where the at least one communication site is coupled to the at least one communication center via a communication channel and the at least one communication center comprises a data interface module (60) coupled to a Call Processing Module (16) and an OA&M module (18) which is coupled to an MCRT (20) whereby the data interface module (60) is configured to process information from the remote unit via the at least one communication site and cause said information to be displayed on the MCRT (20) thus allowing the remote unit to be monitored, operated and controlled.

* * * * *